United States Patent

[11] 3,588,717

[72] Inventor Stanley Harrison
Bedford, Mass.

[21] Appl. No. 835,580

[22] Filed June 23, 1969

[45] Patented June 28, 1971

[73] Assignee KEV Electronics Corp.
Wilmington, Mass.

[54] BEAM SCANNER WITH DEFLECTION PLATE CAPACITANCE FEEDBACK FOR PRODUCING LINEAR DEFLECTION
21 Claims, 4 Drawing Figs.

[52] U.S. Cl. ........ 328/229, 315/29, 328/184, 250/209, 330/46

[51] Int. Cl. ........ H01j 29/74, H01j 39/12, H03k 4/12, H03k 4/50

[50] Field of Search ........ 328/229, 230, 181, 183, 187; 315/26, 29; 330/46

[56] References Cited

UNITED STATES PATENTS 3,453,555 7/1969 Bacon ........ 330/46

*Primary Examiner*—John Kominski
*Assistant Examiner*—V. Lafranchi
*Attorney*—Kenway, Jenney and Hildreth

ABSTRACT: In the beam scanner disclosed herein, a capacitance which includes the capacity between a pair of beam deflection plates is charged at a constant rate by a feedback current supply thereby to obtain a substantially linear scanning of the beam. When the deflection plate voltage reaches a preselected level, the direction of application of the applied current is reversed so as to reverse the scan.

INVENTOR
STANLEY HARRISON
BY
Kenway, Jenney & Hildreth
ATTORNEYS

INVENTOR
STANLEY HARRISON
BY
Kenway, Jenney & Hildreth
ATTORNEYS

Patented June 28, 1971 3,588,717

3 Sheets-Sheet 3

INVENTOR
STANLEY HARRISON
BY
Kenway, Jenney & Hildreth
ATTORNEYS

BEAM SCANNER WITH DEFLECTION PLATE CAPACITANCE FEEDBACK FOR PRODUCING LINEAR DEFLECTION

BACKGROUND OF THE INVENTION

This invention relates to particle accelerators and more particularly to such an accelerator including means for scanning a particle beam generated therein.

In the manufacture of semiconductor devices by means of ion implantation, a beam of high energy ions is scanned in a raster across the surface of a semiconductor matrix or wafer for the purpose of introducing dopants into the semiconductor matrix and thereby change its conductivity characteristics. While various portions of the surface may be masked to selectively prevent doping, it is typically desired that those portions of the surface which are exposed be subjected to a substantially uniform ion flux so as to achieve uniform doping over the exposed area.

In order to obtain such a uniform ion flux, it is desirable that the ion beams be scanned linearly, i.e. at a constant rate. Heretofore, such scanning has typically been provided by generating a triangular waveform at relatively low voltage and power and then amplifying this waveform to the relatively high voltages required to be applied to deflection plates in order to deflect a high energy ion beam. The amplification process is relatively inefficient so that substantial power is wasted in the high voltage output circuitry. Further, the reproduction of the original waveform is complicated by the capacitive loading presented by the deflection plates. The presence of this capacitive loading also establishes a relatively low upper limit on the scan repetition rates at which these prior art amplifying type beam scanners may be operated.

In addition, it is typically difficult to adjust such amplifier type beam scanners in order to change raster size or to maintain raster size when the energy of the beam to be deflected is varied.

Among the several objects of the present invention may be noted the provision of apparatus for scanning a beam of particles in a particle accelerator; the provision of such apparatus which provides a highly linear scan; the provision of such apparatus which dissipates relatively little power; the provision of such apparatus in which raster size remains substantially constant as beam energy is varied; the provision of such apparatus in which the scan rate remains substantially constant as scan voltage is changed; the provision of such apparatus which is reliable; and the provision of such apparatus which is relatively simple and inexpensive and which is reliable.

Other objects and features will be in part apparent and in part pointed out hereinafter.

SUMMARY OF THE INVENTION

Briefly, apparatus according to this invention is useful in a particle accelerator having at least one pair of deflection plates. The apparatus applies a time varying voltage to the plates thereby to linearly scan or deflect the beam of particles being accelerated. A deflection plate capacitance, which includes the capacity between the deflection plates, is charged from a high voltage supply by a feedback controlled circuit which applies a constant regulated flow of current to the capacitance. The apparatus further includes means for discharging the capacitance when the voltage thereon reaches a preselected level. Accordingly, the beam is repetitively scanned in a linear fashion.

BRIEF DESCRIPTION OF THE DRAWINGS

Corresponding reference characters indicate corresponding parts throughout the several views of the drawings.

DESCRIPTION OF THE PREFERRED EMBODIMENTS

Figure 1:
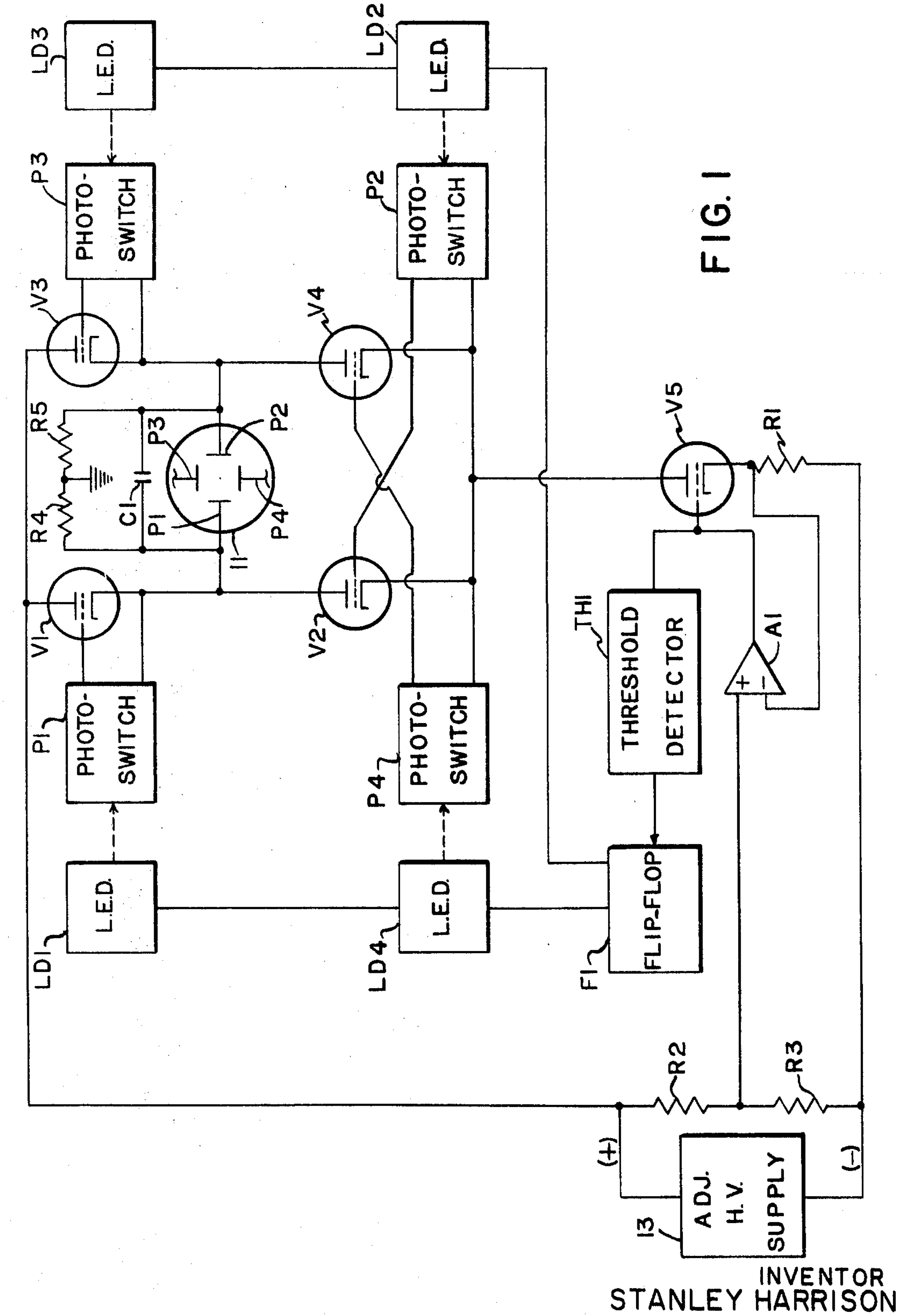
FIG. 1, is a partially schematic block diagram of beam scanning apparatus of the present invention.

Referring now to FIG. 1, there is indicated at 11 the drift space at the output end of the accelerating tube of an ion accelerator. The accelerator is provided with a pair of horizontal deflection plates P1 and P2 and a pair of vertical deflection plates P3 and P4. For the purpose of illustration, the invention is shown as operating to drive the horizontal deflection plates P1 and P2, but it will be understood that similar apparatus or circuitry will typically be provided for driving the plates P3 and P4 at a different frequency so that a suitable scanning raster is obtained.

The plates P1 and P2 are shunted by a capacitor C1. The capacitor C1 together with the distributed capacity between the plates P1 and P2 forms a capacitance which is herein referred to as the deflection plate capacitance. As will be apparent hereinafter, the value of this capacitance determines the linear sweep rate and may be conveniently preselected by the choice of the value of capacitor C1. Nominal potential with respect to ground is established by a pair of resistors R4 and R5.

Current is applied to the deflection plate capacitance from a high voltage supply 13 by means of a network of high voltage vacuum tubes V1—V4 which are interconnected as a reversing switch circuit and by means of a fifth high voltage vacuum tube V5 which is operated as a current regulating device. For reasons which are explained hereinafter, source 13 is preferably operated in conjunction with the source which provides the accelerating voltage to the particle accelerator so that any change in the accelerating voltage produces a proportional change in the supply voltage provided to the scanning circuitry.

A voltage which is proportional to the current flowing through tube V5 is obtained by means of a resistor R1 in the cathode circuit of the tube. As is explained hereinafter, this voltage functions as a feedback signal. Another voltage, which is equal to a predetermined proportion of the source voltage, is obtained by means of a pair of resistors R2 and R3. This second voltage functions as a reference level signal. The feedback and reference voltages are applied to respective inputs of a differential amplifier A1 and the output signal from the amplifier, i.e. an error signal proportional to the difference between the feedback and reference voltages, is applied to the grid of the tube V5. As will be understood by those skilled in the art, the voltage obtained from the resistor R1 thus functions as a feedback signal so that the conductivity of tube V5 is regulated in relation to a reference level in a feedback mode so as to maintain the current through the tube at a predetermined value.

As noted previously, the tubes V1—V4 function as a reversing switch, that is, the current passed by tube V5 is applied to the deflection plate capacitance in one direction when the tubes V1 and V4 are conducting and is applied in the opposite direction when the tubes V2 and V3 are conducting. As the tubes V1—V4 operate at relatively high voltage levels, e.g. 10,000 volts, isolated control of the conductivity of each tube is controlled by means of a respective photoswitch P1—P4. Thus, the conductivities of the different tubes may be controlled optically without direct connection to the control elements of the tubes. Each photoswitch circuit P1—P4 is selectively actuated or controlled by a respective light-emitting diodes (L.E.D.) LD1—LD4. As will be apparent hereinafter, the operation of the photoswitch circuitry is such that a given one of the tubes V1—V4 is cut off when the respective light-emitting diode is energized. To maintain good optical coupling between each photoswitch circuit and the respective light-emitting diode without bringing the respective circuits into proximity, insulating light pipes may be employed as understood by those skilled in the art.

The light-emitting diodes LD1—LD4 are selectively energized under the control of a flip-flop circuit F1, the diodes LD2 and LD3 being energized in one state of the flip-flop circuit and the diodes LD1 and LD4 being energized in the other state of the flip-flop circuit. The flip-flop circuit itself is in turn controlled by a threshold detector circuit TH1 which is responsive to the voltage applied to the grid of the vacuum tube V5.

Briefly, the operation of this apparatus is as follows. Assuming that the flip-flop circuit F1 is in its first state so that the light-emitting diodes LD1 and LD4 are deenergized and the tubes V1 and V4 are conducting, the current passed by tube V5 is applied to the deflection plate capacitance in one direction, i.e. so that the plate P1 becomes positive with respect to the plate P2. Since the value of the current applied is maintained constant by the feedback control applied around tube V5, the voltage across the deflecting capacitance will change substantially linearly. Accordingly, a substantially linear deflection of an ion beam passing between the plates P1 and P2 will be obtained.

As the voltage across the deflection plates P1 and P2 approaches the supply voltage provided by source 13, the voltage applied to the grid of the tube V5 will increase as the feedback circuit attempts to increase the conductivity of the tube V5 to compensate for the decreasing plate-cathode voltage. At a preselected value of this grid voltage, the threshold detector circuit TH1 is tripped and in turn causes the flip-flop circuit F1 to reverse states. When the flip-flop circuit F1 changes from the one state to the opposite state, the light-emitting diodes LD1 and LD4 are energized and the diodes LD2 and LD3 are deenergized. Thus, the direction in which the current passed by tube V5 is applied to the deflection plate capacitance is reversed by the switching network comprising tubes V1—V4. The voltage across the plates P1 and P2 will thus begin to change linearly in the opposite direction, i.e. the plate P2 will become more positive with respect to the plate P1 and an ion beam passing between the plates will be deflected in the opposite direction. Again this deflection will be at a linear rate corresponding to the relative values of the current passed by tube V5 and the total value of the deflection plate capacitance.

When the voltage across the deflection plate capacitance in this reverse direction approaches the supply voltage, the potential at the grid of tube V5 will again rise and trip the threshold detector circuit TH1. Accordingly, the flip-flop circuit F1 again reverses states thereby restarting the cycle. In summary then, it can be seen that a triangular waveform is generated across the deflection plate capacitance and that an ion beam passing between the deflection plates will be scanned linearly from side to side. As noted previously, a similar circuit will typically be provided for driving the plates P3 and P4 so as to cause deflection in the vertical direction at a different repetition rate so that a raster is generated which provides uniform coverage of a given target, e.g. a semiconductor matrix.

Since the current level, measured by means of resistor R1, is determined in relation to a reference voltage which is a predetermined proportion of the supply voltage it can be seen that the lateral sweep rate will vary substantially in proportion to the supply voltage. Accordingly, the sweep repetition rate or scanning frequency will remain substantially constant as the voltage provided by the high voltage source 13 is varied. Thus the raster size can be varied without varying the sweep repetition rate. Further, if the source 13 is operated in conjunction with the high voltage source which provides the acceleration of the ion beam so that the two voltages vary in proportion to one another, it will be understood by those skilled in the art that the raster size will remain substantially constant even though the particle energy is varied since a higher deflection voltage will be available to deflect the higher energy particles.

Figure 2:
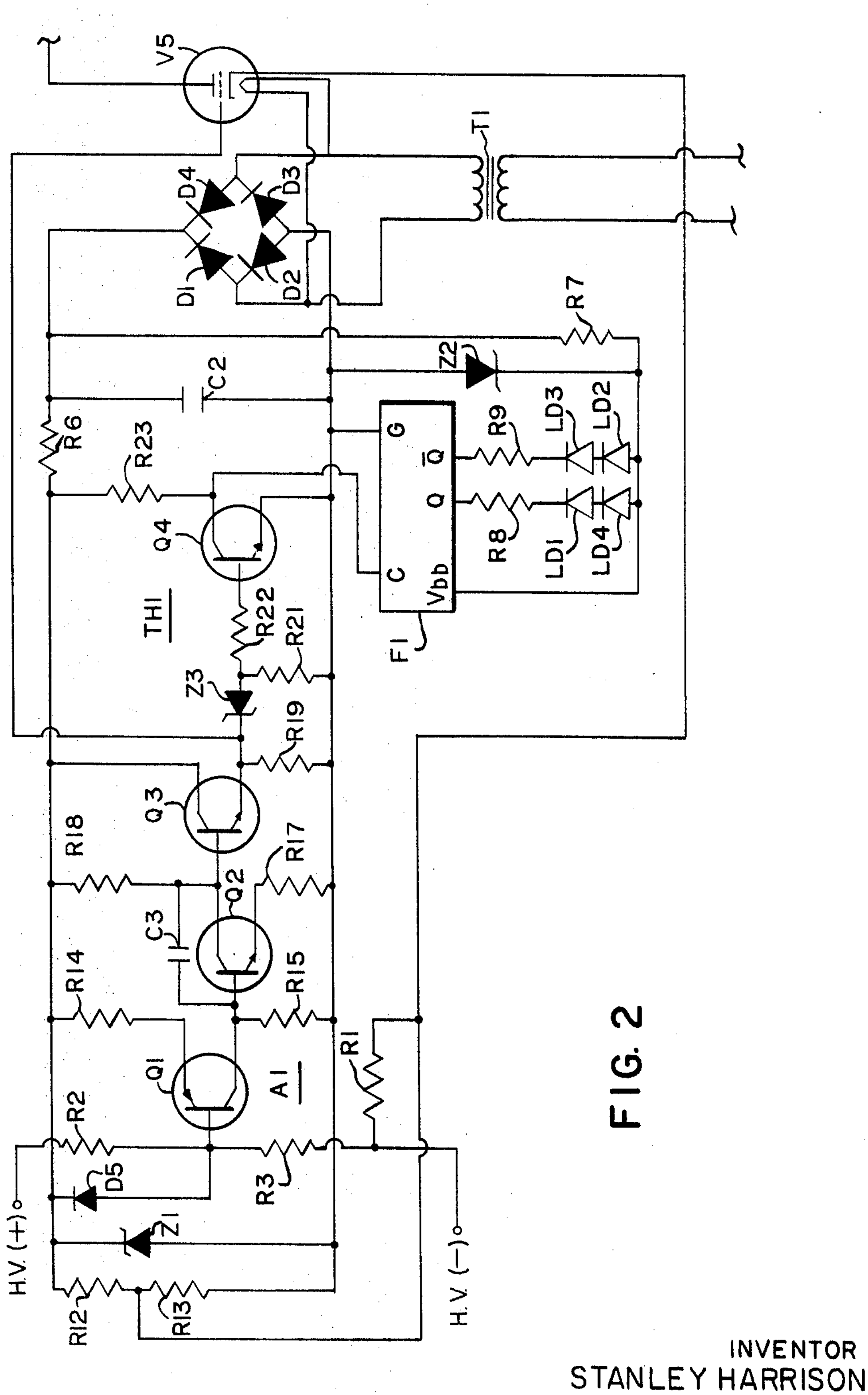
FIG. 2, is a schematic circuit diagram of a current regulating circuit employed in the FIG. 1 apparatus.

Referring now to FIG. 2 in which additional details of the current regulating circuit are shown, the filament of the current regulating tube V5 is shown as being energized by means of the suitable transformer T1 having appropriate insulation between primary and secondary windings. Filament transformer T1 also provides a suitably isolated source of power for the transistorized circuitry which comprises the amplifier A1, the threshold detector TH1 and the flip-flop F1. The AC provided by the secondary winding of transformer T1 is rectified by means of a bridge comprising diodes D1—D4 and filtered by means of a capacitor C2. Regulation of the amplifier and threshold detector supply voltage is provided by means of a dropping resistor R6 and a Zener diode Z1. Flip-flop circuit F1 is conveniently constituted by an integrated circuit unit such as the Motorola type MC845 with appropriate interconnections and regulation of the flip-flop supply voltage to a suitable level is provided by a dropping resistor R7 and a Zener diode Z2. The light-emitting diodes LD1 and LD4 are selectively energized from the Q output of the flip-flop F1 through a current limiting series resistor R8 while diodes LD2 and LD3 are energized from the $\overline{Q}$ output through a resistor R9.

The potential of the DC supply for the amplifier A1 is established in relation to the potentials in the high voltage circuit by means of a pair of resistors R12 and R13 which are connected in series across the low voltage supply leads while the junction between the two resistors is connected to the cathode of tube V5.

The voltage which is a preselected proportion of the high voltage source is applied to the base terminal of a PNP transistor Q1 which constitutes the first stage of amplifier A1. Reverse biasing of the base emitter circuit of this transistor is limited by a diode D5. Transistor Q1 is provided with respective emitter and collector load resistors R14 and R15 and drives an NPN transistor Q2 which constitutes a second stage of the amplifier. The emitter and collector of transistor Q2 are provided with respective load resistors R17 and R18. The collector-base circuit of this second stage is shunted by a capacitor C3 which aids stability. The collector of transistor Q2 is connected to the base of a second NPN transistor Q3 which functions as an emitter follower for driving the grid of tube V5, an appropriate emitter load resistor being indicated at R19.

An NPN transistor Q4 functions as the threshold detector circuit TH1. Transistor Q4 is normally biased off by means of a pair of resistors R21 and R22 but is turned on when the voltage applied to the grid of tube V5 exceeds the operating voltage of a Zener diode Z3. When transistor Q4 is turned on, a negative-going voltage is generated across a load resistor R23 and this negative-going transition triggers the flip-flop circuit F1.

Insofar as they may be useful to an understanding of the operation of the FIG. 2 circuit, various values and type designations of the components of this circuit are given in the following table.

| | |
|---|---|
| V5 | 6BK4 |
| R1 | 330k ohms |
| R2 | 50M ohms |
| R3 | 1.5M ohms |
| R4 | $10^{10}$ ohms |
| R5 | $10^{10}$ ohms |
| R6 | 68 ohms |
| R7 | 27 ohms |
| R8 | 75 ohms |
| R9 | 75 ohms |
| R12 | 1k ohms |
| R13 | 270 ohms |
| R14 | 22k ohms |
| R15 | 68k ohms |
| R17 | 6.8k ohms |
| R18 | 270 ohms |
| R19 | 10k ohms |
| R21 | 7k ohms |
| R22 | 2.2k ohms |
| R23 | 10k ohms |
| T1 | 6.3 volt (secondary) |
| Z1 | 6 volt |
| Z2 | 4.7 volt |
| Z3 | 5 volt |

| | |
|---|---|
| C1 | 0.0005 microfarad |
| C2 | 400 microfarad |

Figures 3, 4:
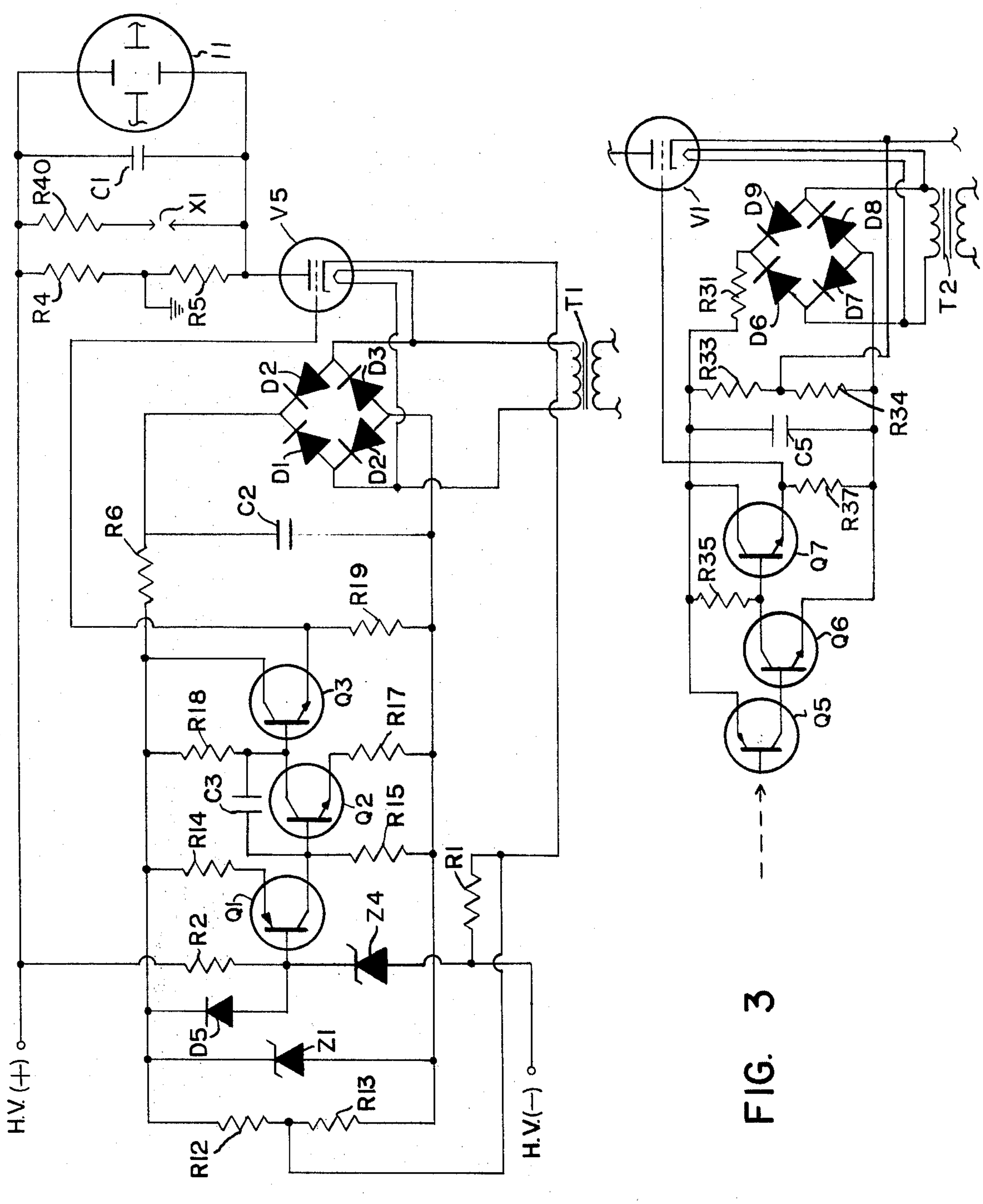
FIG. 3, is a schematic circuit diagram of one of several similar optically controlled switching circuits employed in the FIG. 1 apparatus.
FIG. 4, is a schematic circuit diagram of another embodiment of a beam scanner according to this invention.

In the optically controlled switching circuitry illustrated in FIG. 3, the filament transformer T2 which energizes the filament of tube V1 is similarly used to obtain a floating or isolated DC supply for the control circuitry for that tube. Rectification is obtained by means of diodes D6—D9 with filtering being provided by a resistor R31 and a capacitor C5. The potential of the low voltage DC supply leads with respect to the cathode of tube V1 is established by a voltage divider comprising a pair of resistors R33 and R34.

An optical control signal, i.e. light emitted by the respective light-emitting diode LD1—LD4, is sensed by means of a phototransistor Q5. The signal provided by transistor Q5 is amplified by an NPN transistor of Q6 which is provided with load resistor R35. The output signal from the collector of transistor Q6 is then applied, through an emitter follower NPN transistor Q7 having an emitter load resistor R37, to the grid of tube V1. As will be understood by those skilled in the art, the presence of light which produces conduction in phototransistor Q5 will cause the tube V1 to be turned off as noted previously. As with the current regulating circuit of FIG. 2, the following component values are given for the purpose of facilitating an understanding of the detailed operation of the particular circuit which has been shown by way of illustration.

| | |
|---|---|
| V1—V4 | 6BK4 |
| R31 | 150 ohms |
| R33 | 2.2k ohms |
| R34 | 1k ohms |
| R35 | 470k ohms |
| C5 | 400 microfarads |
| Q5 | L14B (General Electric) |
| T2 | 6.3 volt (secondary) |

In the embodiment illustrated in FIG. 4, the tube V5 is again operated to provide a substantially constant current by a control circuit which is essentially similar to that illustrated in FIG. 2, except that the reference voltage is a fixed voltage, regulated by a Zener diode Z4, rather than a preselected proportion of the total supply voltage. Instead of periodically reversing the direction of application of the constant current to the deflection plate capacitance, the embodiment of FIG. 4 employs an adjustable spark gap, designated X1, which is connected across the capacitor C1 and the deflection plates through a current limiting resistor R40 so as to discharge the deflection plate capacitance when the voltage thereon reaches a predetermined level. As is understood by those skilled in the art, the voltage at which such a spark gap breaks down may be adjusted by appropriately setting the width of the gap or by varying the DC potential on a third electrode adjacent the spark gap.

In operation, the deflection plate capacitance is charged linearly by the constant current source so that a linear scan is obtained. When the total voltage across the deflection plates reaches the predetermined value set by the breakdown voltage of spark gap X1, the spark gap breaks down thereby discharging the deflection plate capacitance to a relatively low voltage. As soon as the deflection plate capacitance is thus discharged, the constant current source again begins to linearly recharge the capacitance. Thus, a sawtooth waveform is generated across the deflection plates as contrasted with the triangular waveform which is generated by the embodiment of FIG. 1. However, as is understood by those skilled in the art, such a sawtooth waveform will also yield a substantially uniform average ion flux over the corresponding raster area.

In view of the foregoing, it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

I claim:

1. In a particle accelerator having at least one pair of deflection plates for deflecting a beam of particles being accelerated, apparatus for applying a time varying voltage to said plates thereby to scan said particle beam, said apparatus comprising:
   - a high voltage current supply;
   - means defining a deflection plate capacitance including the capacity between said plates and including also a separate capacitor connected to said plates;
   - feedback controlled means connected in circuit to said deflection plates for applying a regulated flow of current to said capacitance from said high voltage supply; and
   - means for discharging said capacitance when the voltage thereon reaches a preselected level.

2. Apparatus as set forth in claim 1 wherein said means for discharging said capacitance comprises means for applying said regulated flow of current in a reverse direction.

3. Apparatus as set forth in claim 1 wherein said means for discharging said capacitance comprises a voltage responsive breakdown device for discharging said capacitor relatively quickly.

4. Apparatus as set forth in claim 3 wherein said breakdown device comprises a spark gap.

5. Apparatus as set forth in claim 1 wherein said feedback controlled means regulates the flow of current to said capacitor as a function of the relative amplitudes of a first voltage which is proportional to said current and a second voltage which is fixed.

6. Apparatus as set forth in claim 1 wherein said feedback controlled means regulates the flow of current to said capacitor as a function of the relative amplitudes of a first voltage which is proportional to said current and a second voltage which is a preselected proportion of the voltage provided by said supply.

7. In a particle accelerator having at least one pair of deflection plates for deflecting a beam of particles being accelerated, apparatus for applying a time varying voltage to said plates thereby to scan said particle beam, said apparatus comprising:
   - a high voltage current supply;
   - means defining a deflection plate capacitance including the capacity between said plates and including also a separate capacitor connected to said plates;
   - feedback controlled means connected in circuit to said deflection plates for applying a regulated flow of current to said capacitance from said high voltage supply; and
   - means for reversing the direction of application of said current to said capacitance when the voltage thereon reaches a preselected level.

8. Apparatus as set forth in claim 7 wherein said means for applying a flow of current to said capacitance regulates said flow as a function of the relative values of a feedback voltage which is proportional to said current and a reference voltage.

9. Apparatus as set forth in claim 8 wherein said means for applying a flow of current to said capacitance generates an error signal having an amplitude which is a function of the difference between said feedback and reference voltages.

10. Apparatus as set forth in claim 9 wherein said means for reversing the direction of application of said current includes a threshold detector which responds to the amplitude of said error for reversing the direction of application when said error signal exceeds a predetermined level.

11. Apparatus as set forth in claim 10 wherein said means for reversing said current includes a flip-flop circuit which is triggered by said threshold detector when said error signal exceeds said predetermined level.

12. Apparatus as set forth in claim 9 wherein said feedback controlled means includes a vacuum tube for controlling said flow of current and said error signal is applied to the grid of said tube.

13. Apparatus as set forth in claim 7 wherein said means for reversing the direction of application of said current includes four current switching devices which are activated in pairs to apply said current to said capacitance in a respective direction.

14. Apparatus as set forth in claim 13 wherein said switching devices are optically controlled to provide electrical isolation.

15. Apparatus as set forth in claim 14 wherein said reversing means includes a flip-flop circuit which is triggered when the voltage on said capacitance reaches said preselected level.

16. Apparatus as set forth in claim 15 wherein said reversing means includes:

at least one light source which is energized when said flip-flop circuit is in one state and which effects actuation of one pair of said switching devices; and at least one other light source which is energized when said flip-flop circuit is in the opposite state and which effects actuation of the pair of said switching devices.

17. Apparatus as set forth in claim 16 wherein said light sources are light-emitting diodes.

18. Apparatus as set forth in claim 13 wherein said switching devices are vacuum tubes.

19. In a particle accelerator having at least one pair of deflection plates for deflecting a beam of particles being accelerated, apparatus for applying a time varying voltage to said plates thereby to scan said particle beam, said apparatus comprising:

a high voltage current supply;

means defining a deflection plate capacitance including the capacity between said plates and including also a separate capacitor connected to said plates;

a first vacuum tube in series with said source and said capacitance for controlling the flow of current to said capacitance;

a resistor in series with said first tube for providing a feedback voltage which is proportional to the current being applied to said capacitance;

means for providing a reference voltage;

an amplifier operative to provide to the grid of said first tube an error signal which is a function of the difference between said feedback voltage and said reference voltage;

a set of four vacuum tubes interconnected with said capacitance and said first vacuum tube for selectively reversing the direction of application of current to said capacitance, a respective pair of said tubes being energized for each direction of application;

for each tube in said set of four, a respective photodetector control for controlling the bias applied to the grid of that tube;

a flip-flop circuit;

means for reversing the state of said flip-flop circuit when the voltage on said capacitance reaches a preselected level; and for each of the two states of said flip-flop circuit, a light source means which is energized in the respective state and which is coupled to the photodetector controls of a respective pair of tubes in said set, whereby a substantially constant current is applied to said capacitance and the direction of application is periodically reversed thereby to generate a triangular waveform across said capacitance.

20. Apparatus as set forth in claim 19 wherein said means for reversing the state of said flip-flop circuit comprises a threshold detector responsive to the amplitude of said error signal.

21. Apparatus as set forth in claim 19 wherein said means for providing a reference voltage is a resistive voltage divider connected across said source whereby said reference voltage is a preselected proportion of the source voltage.